(12) United States Patent
Fukami et al.

(10) Patent No.: US 11,233,259 B2
(45) Date of Patent: Jan. 25, 2022

(54) FUEL CELL SYSTEM AND CONTROL METHOD

(71) Applicant: TOYOTA JIDOSHA KABUSHIKI KAISHA, Toyota (JP)

(72) Inventors: Tatsuya Fukami, Toyoya (JP); Junichi Matsuo, Okazaki (JP); Tomoya Ogawa, Okazaki (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 114 days.

(21) Appl. No.: 16/836,144

(22) Filed: Mar. 31, 2020

(65) Prior Publication Data
US 2020/0328441 A1    Oct. 15, 2020

(30) Foreign Application Priority Data
Apr. 12, 2019    (JP) .............................. JP2019-076265

(51) Int. Cl.
*H01M 8/04828*    (2016.01)
*B60L 58/40*    (2019.01)
(Continued)

(52) U.S. Cl.
CPC ......... *H01M 8/04947* (2013.01); *B60L 58/30* (2019.02); *B60L 58/40* (2019.02);
(Continued)

(58) Field of Classification Search
CPC ...... B60L 1/00; B60L 2260/54; B60L 3/0046; B60L 50/75; B60L 58/12; B60L 58/13; B60L 58/14; B60L 58/15; B60L 58/30; B60L 58/40; H01M 16/006; H01M 2250/20; H01M 8/04932; H01M 8/04947; H01M 8/04992; Y02E 60/10; Y02E 60/50; Y02T 10/70; Y02T 90/40

See application file for complete search history.

(56) References Cited

U.S. PATENT DOCUMENTS

2012/0248872 A1* 10/2012 Saeki .................. H01M 16/006
                                                      307/48
2018/0123152 A1*  5/2018 Matsumoto ....... H01M 8/04649
2018/0198145 A1   7/2018 Watanabe et al.

FOREIGN PATENT DOCUMENTS

| EP | 1548453 A1 | 6/2005 |
| JP | 2007-157631 A | 6/2007 |
| JP | 2018-113158 A | 7/2018 |

* cited by examiner

*Primary Examiner* — Adam A Arciero
(74) *Attorney, Agent, or Firm* — Hunton Andrews Kurth LLP

(57) ABSTRACT

A fuel cell system includes a fuel cell, a plurality of power consuming devices, a secondary battery, a charge-discharge amount sensor, and a controller configured to control operations of the plurality of power consuming devices. An identification section of the controller is configured to execute a variation process of varying the operation command value of one of the plurality of power consuming devices and, in a second case where an absolute value of a difference between an amount of change in the actual amount of charge and discharge and an amount of change in the estimated amount of charge and discharge before and after execution of the variation process is greater than a second threshold, identify the power consuming device, for which the operation command value is varied, as the device to be identified.

8 Claims, 7 Drawing Sheets

(51) Int. Cl.
*B60L 58/30* (2019.01)
*H01M 8/04858* (2016.01)
*H01M 8/04992* (2016.01)
*H01M 16/00* (2006.01)

(52) U.S. Cl.
CPC ... *H01M 8/04932* (2013.01); *H01M 8/04992* (2013.01); *H01M 16/006* (2013.01); *H01M 2250/20* (2013.01)

FIG. 1

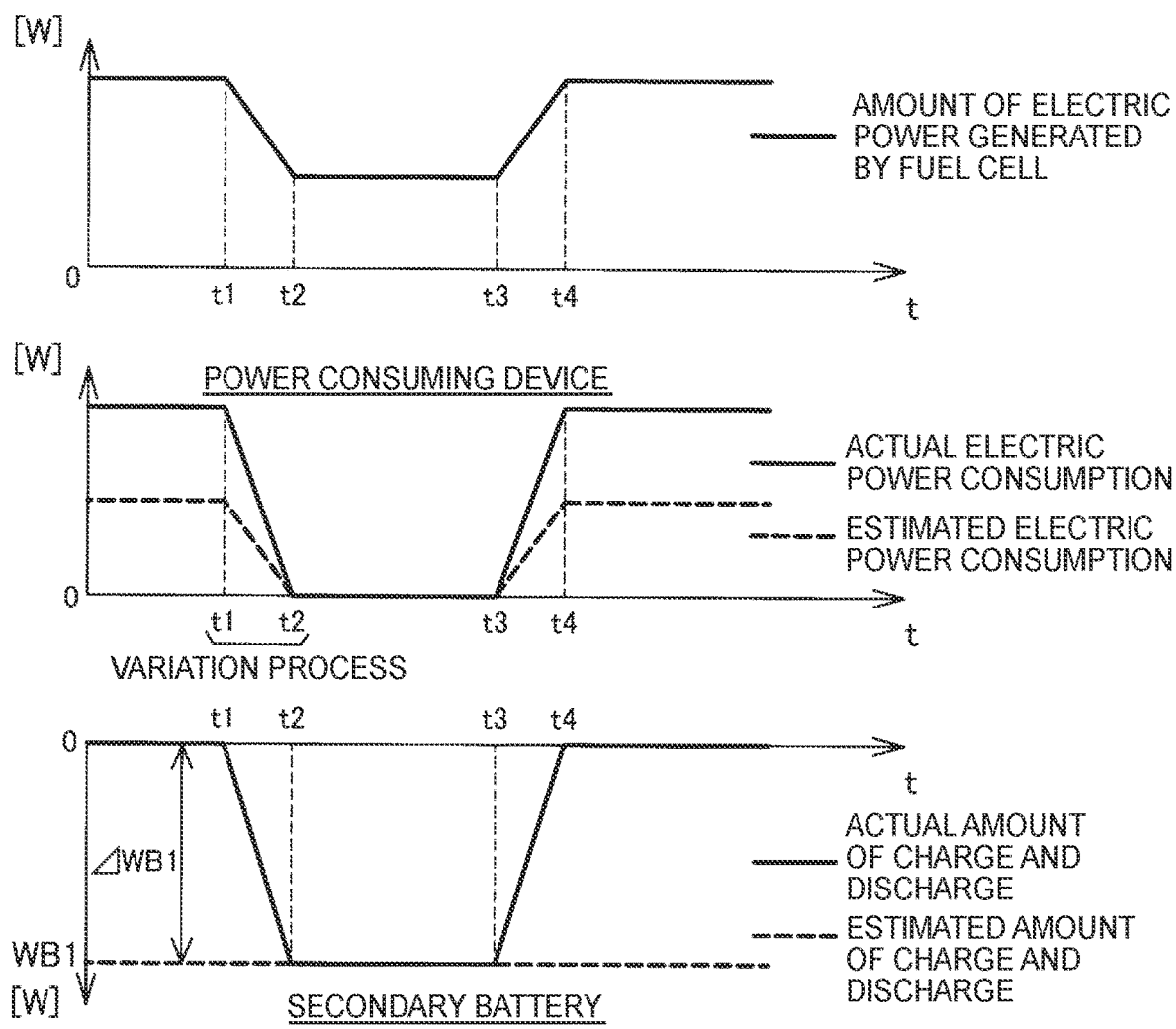

FUEL CELL SYSTEM AND CONTROL METHOD

INCORPORATION BY REFERENCE

The disclosure of Japanese Patent Application No. 2019-076265 filed on Apr. 12, 2019 including the specification, drawings and abstract is incorporated herein by reference in its entirety.

BACKGROUND

1. Technical Field

The disclosure relates to a technology for fuel cell systems.

2. Description of Related Art

Hitherto, a fuel cell system including a secondary battery, a fuel cell, and a plurality of power consuming devices such as a hydrogen pump is known (Japanese Unexamined Patent Application Publication No. 2018-113158 (JP 2018-113158 A)). When the amount of electric power generated by the fuel cell is greater than an electric power consumption of the plurality of power consuming devices, the secondary battery stores a dump electric power. When the amount of electric power generated by the fuel cell is less than an electric power consumption of the plurality of power consuming devices, the secondary battery compensates for a shortage of electric power by discharging an electric power equivalent to the shortage.

SUMMARY

In an existing technology, a deviation in electric power consumption, that is, a deviation in electric power consumption from an estimated electric power consumption, is occurring in a power consuming device. In this case, it has been difficult to identify the power consuming device in which a deviation in electric power consumption is occurring from among the plurality of power consuming devices. When the power consuming device in which a deviation in electric power consumption is occurring is identified, a process for avoiding an overcharge or overdischarge of the secondary battery can be executed according to the power consuming device in which a deviation in electric power consumption is occurring.

The disclosure may be implemented as the following modes.

An aspect of the disclosure provides a fuel cell system that is mounted on a vehicle. The fuel cell system includes a fuel cell, a plurality of power consuming devices configured to consume a generated electric power generated by the fuel cell, a secondary battery configured to, when an amount of electric power generated by the fuel cell is greater than an electric power consumption of the plurality of power consuming devices, be charged with a dump electric power and, when the amount of electric power generated by the fuel cell is less than the electric power consumption of the plurality of power consuming devices, discharge an electric power equivalent to a shortage of electric power, a charge-discharge amount sensor configured to be used to calculate an amount of charge and discharge of the secondary battery, and a controller configured to control operations of the plurality of power consuming devices by using operation command values for the plurality of power consuming devices. The controller includes a calculation section configured to calculate an actual amount of charge and discharge of the secondary battery by using a detected value of the charge-discharge amount sensor, an estimation section configured to estimate electric power consumptions of the plurality of power consuming devices by using the operation command values, and estimate an estimated amount of charge and discharge of the secondary battery by using the estimated electric power consumptions and the amount of electric power generated by the fuel cell, and an identification section configured to, in a first case where an absolute value of a difference between the actual amount of charge and discharge and the estimated amount of charge and discharge is greater than or equal to a first threshold, identify a device to be identified, in which the electric power consumption estimated by the estimation section deviates from an actual electric power consumption, from among the plurality of power consuming devices. The identification section is configured to execute a variation process of varying the operation command value for one of the plurality of power consuming devices and, in a second case where an absolute value of a difference between an amount of change in the actual amount of charge and discharge and an amount of change in the estimated amount of charge and discharge before and after execution of the variation process is greater than a second threshold, identify the power consuming device, for which the operation command value is varied, as the device to be identified. With this aspect, the power consuming device in which a deviation in electric power consumption is occurring can be identified by the identification section.

In the above aspect, the controller may further include a power generation amount adjustment section configured to, in the second case, adjust the amount of electric power generated by the fuel cell such that the absolute value of the difference between the actual amount of charge and discharge and the estimated amount of charge and discharge becomes less than the first threshold. With this aspect, by adjusting the amount of electric power generated by the fuel cell such that the absolute value of the difference between the actual amount of charge and discharge and the estimated amount of charge and discharge becomes less than the first threshold, an overcharge or overdischarge of the secondary battery can be avoided.

In the above aspect, the power generation amount adjustment section may be configured to, when the secondary battery satisfies a charging condition, cause the fuel cell to generate an electric power such that the amount of electric power generated by the fuel cell becomes greater than a required amount of electric power generated when the actual amount of charge and discharge is less than the estimated amount of charge and discharge, and cause the fuel cell to generate an electric power such that the amount of electric power generated by the fuel cell becomes less than the required amount of electric power generated when the actual amount of charge and discharge is greater than the estimated amount of charge and discharge. With this aspect, the absolute value of the difference between the actual amount of charge and discharge and the estimated amount of charge and discharge is reduced below the first threshold by increasing or decreasing the amount of electric power generated by the fuel cell with respect to a required amount of electric power generated, with the result that an overcharge or overdischarge of the secondary battery can be avoided.

In the above aspect, the power generation amount adjustment section may be configured to, when the secondary battery satisfies a discharging condition, cause the fuel cell to generate an electric power such that the amount of electric power generated by the fuel cell becomes less than a required amount of electric power generated when the actual amount of charge and discharge is less than the estimated amount of charge and discharge, and cause the fuel cell to generate an electric power such that the amount of electric power generated by the fuel cell becomes greater than the required amount of electric power generated when the actual amount of charge and discharge is greater than the estimated amount of charge and discharge. With this aspect, the absolute value of the difference between the actual amount of charge and discharge and the estimated amount of charge and discharge is reduced below the first threshold by increasing or decreasing the amount of electric power generated by the fuel cell with respect to a required amount of electric power generated, with the result that an overcharge or overdischarge of the secondary battery can be avoided.

In the above aspect, the controller may further include a command value control section configured to, in the second case, adjust the operation command value for the device to be identified such that the absolute value of the difference between the actual amount of charge and discharge and the estimated amount of charge and discharge becomes less than the first threshold. With this aspect, by adjusting the operation command value for the device to be identified such that the absolute value of the difference between the actual amount of charge and discharge and the estimated amount of charge and discharge becomes less than the first threshold, an overcharge or overdischarge of the secondary battery can be avoided.

In the above aspect, the command value control section may be configured to, when the secondary battery satisfies a charging condition, adjust the operation command value for the device to be identified such that the electric power consumption becomes less than a required electric power from the device to be identified when the actual amount of charge and discharge is less than the estimated amount of charge and discharge, and adjust the operation command value for the device to be identified such that the electric power consumption becomes greater than the required electric power from the device to be identified when the actual amount of charge and discharge is greater than the estimated amount of charge and discharge. With this aspect, the absolute value of the difference between the actual amount of charge and discharge and the estimated amount of charge and discharge is reduced below the first threshold by adjusting the operation command value such that the electric power consumption of the device to be identified is greater than a required electric power or such that the electric power consumption of the device to be identified is less than the required electric power, an overcharge or overdischarge of the secondary battery can be avoided.

In the above aspect, the command value control section may be configured to, when the secondary battery satisfies a discharging condition, adjust the operation command value for the device to be identified such that the electric power consumption becomes greater than a required electric power from the device to be identified when the actual amount of charge and discharge is less than the estimated amount of charge and discharge, and adjust the operation command value for the device to be identified such that the electric power consumption becomes less than the required electric power from the device to be identified when the actual amount of charge and discharge is greater than the estimated amount of charge and discharge. With this aspect, the absolute value of the difference between the actual amount of charge and discharge and the estimated amount of charge and discharge is reduced below the first threshold by adjusting the operation command value such that the electric power consumption of the device to be identified is greater than a required electric power or such that the electric power consumption of the device to be identified is less than the required electric power, an overcharge or overdischarge of the secondary battery can be avoided.

The disclosure may be implemented in various modes other than the above and may be implemented by modes, such as a control method for the fuel cell system, a program for executing the control method, and a vehicle on which the fuel cell system is mounted.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 1 is a diagram for illustrating a fuel cell system;
FIG. 5 is a table that shows power consuming devices to be subjected to the monitoring process;
FIG. 6 is a first timing chart for illustrating step S10 to step S30 in FIG. 4.

DETAILED DESCRIPTION OF EMBODIMENTS

A. Embodiment

Figure 1:
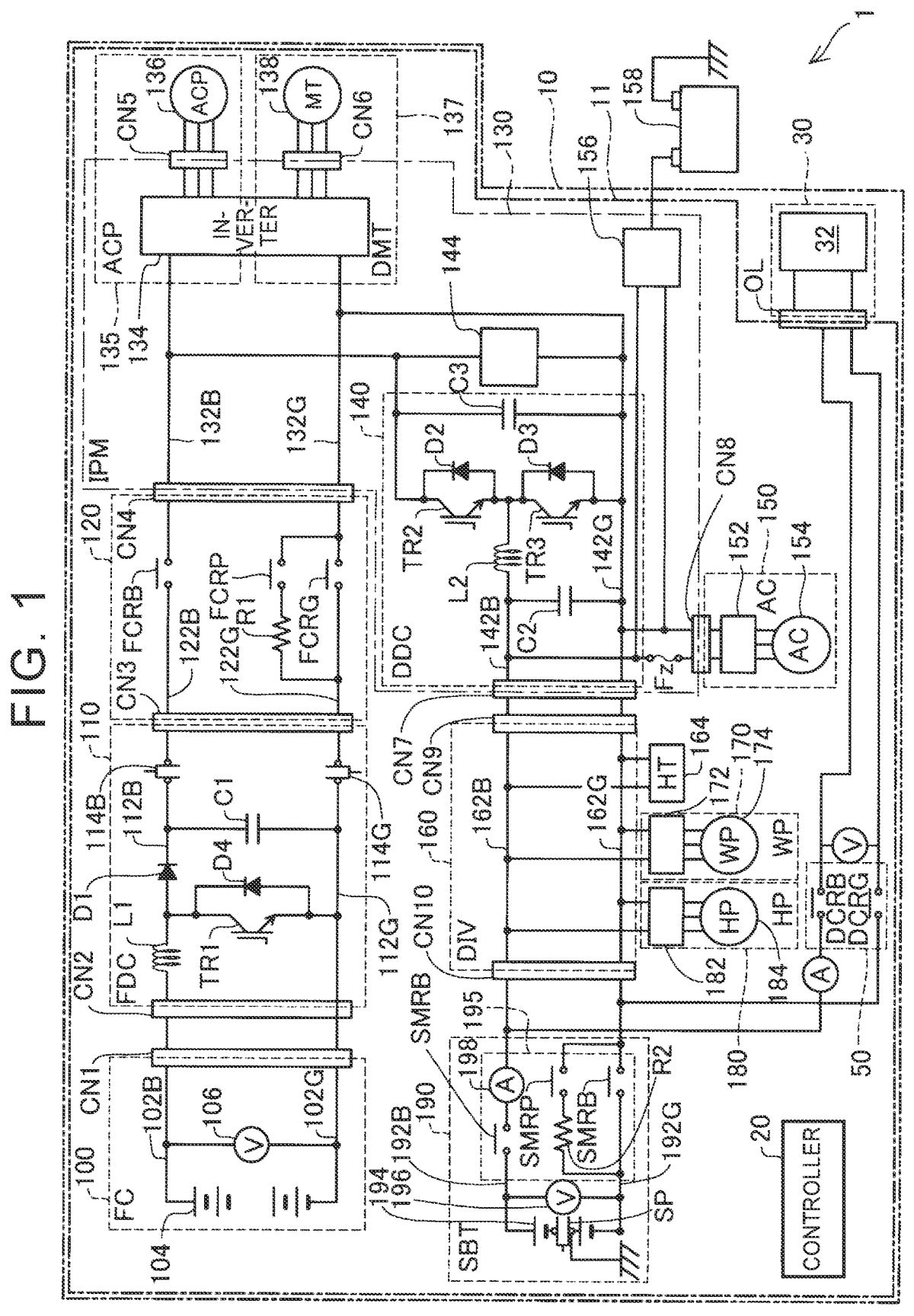
Figure 2:
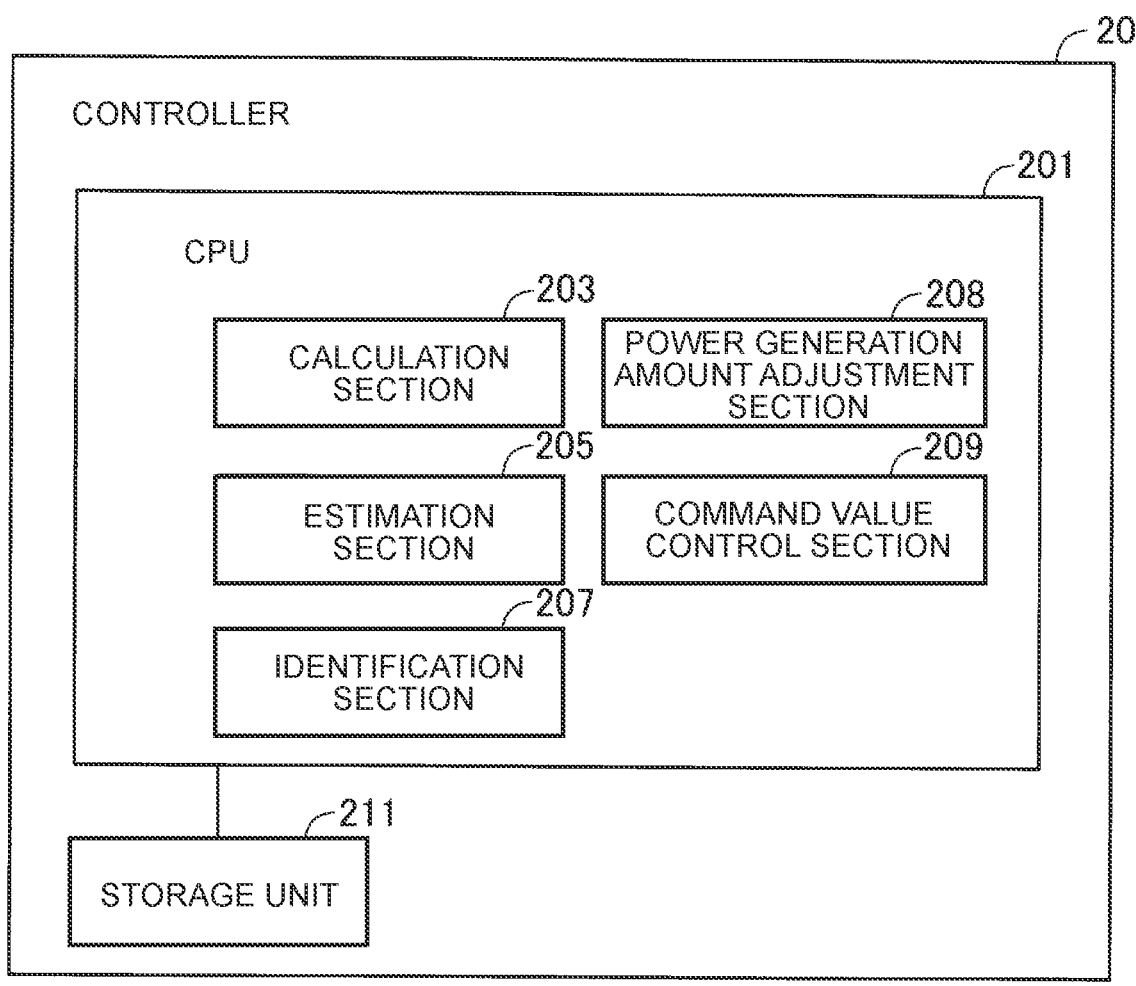
FIG. 2 is an internal block diagram of a controller.

FIG. 1 is a diagram for illustrating a fuel cell system 10. The fuel cell system 10 is mounted on a vehicle 1. The fuel cell system 10 includes a power supply section 11, an external power output device 30, and a controller 20. The external power output device 30 is supplied with a direct-current power. The external power output device 30 includes an external power output part 32 and an external ground-fault detector (not shown). The controller 20 controls the operation of the fuel cell system 10. For example, the controller 20 controls operation command values for a plurality of power consuming devices. In the present embodiment, the power consuming devices include a drive motor 138, an air compressor 136, a hydrogen pump 184, a water pump 174, a heater 164, and an air conditioner 154. These power consuming devices consume a generated electric power generated by a fuel cell 104 (described later). The power consuming devices are high-voltage loads of which the driving voltages are high, and are supplied with, for example, an electric power of which the voltage has been stepped up to about 300 V.

The power supply section 11 includes a fuel cell unit 100, an FC converter unit 110 (hereinafter, referred to as FC converter 110), an FC relay unit 120 (hereinafter, referred to as FC relay 120), an intelligent power module unit 130 (hereinafter, referred to as IPM 130), an air conditioner unit 150, a branching unit 160, a water pump unit 170, a hydrogen pump unit 180, a secondary battery unit 190, and a power output relay 50.

The IPM 130 further includes an air compressor unit 135, a drive motor unit 137, and a DC-DC converter unit 140 (referred to as DDC converter 140).

The power output relay 50 includes a positive contact (hereinafter, referred to as power output relay DCRB) and a negative contact (hereinafter, referred to as power output relay DCRG). Of the power output relay DCRB and the power output relay DCRG, the sign ending in "B" means a positive side and the sign ending in "G" means a negative side (this also applies to other relays and wires that will be described below).

The FC converter 110 is connected to the fuel cell unit 100. The FC relay 120 is connected to the FC converter 110. The IPM 130 is connected to the FC relay 120. The air conditioner unit 150 and the branching unit 160 are connected to the IPM 130. The water pump unit 170, the hydrogen pump unit 180, and the secondary battery unit 190 are connected to the branching unit 160.

The external power output device 30 is placed outside the vehicle 1 and is connected to the secondary battery unit 190 via the power output relay 50 disposed in the vehicle 1.

The fuel cell unit 100 includes high-voltage wires 102B, 102G, the fuel cell 104, a voltmeter 106, and a connector CN1. In the present embodiment, the fuel cell 104 is a polymer electrolyte fuel cell. The output power of the fuel cell 104 is output to the FC converter 110 via the connector CN1.

The FC converter 110 includes high-voltage wires 112B, 112G, service plugs 114B, 114G, a reactor L1, a switching transistor TR1, diodes D1, D4, a smoothing capacitor C1, an input connector CN2, and an output connector CN3. One terminal of the reactor L1 is connected to the positive side of the input connector CN2, and the other terminal of the reactor L1 is connected to the anode of the diode D1. The cathode of the diode D1 is connected to the positive service plug 114B via the high-voltage wire 112B. The negative side of the input connector CN2 is connected to the negative service plug 114G via the high-voltage wire 112G. The switching transistor TR1 is provided between the anode of the diode D1 and the high-voltage wire 112G. The diode D4 is provided in parallel with the switching transistor TR1. The FC converter 110 steps up a voltage input from the input connector CN2 and outputs the stepped-up voltage from the output connector CN3 as a result of turning on or off of the switching transistor TR1.

The FC relay 120 includes high-voltage wires 122B, 122G, a positive contact (hereinafter, referred to as FC relay FCRB), a negative contact (hereinafter, referred to as FC relay FCRG), a precharge contact (hereinafter, referred to as precharge relay FCRP), and a resistor R1. The positive FC relay FCRB is provided in the positive high-voltage wire 122B. The negative FC relay FCRG is provided in the negative high-voltage wire 122G. The precharge relay FCRP and the resistor R1 are connected in series with each other and are provided in parallel with the negative FC relay FCRG. The precharge relay RCRP and the resistor R1 are provided in parallel with the negative FC relay FCRG. Thus, when the precharge relay FCRP is turned on before the negative FC relay FCRG is turned on, only a current limited by the resistor R1 flows through the relay FCRP. As a result, the relay FCRP is not welded when the relay FCRP is turned on. After that, when the FC relay FCRG is turned on after the difference in voltage between both sides of the FC relay FCRG becomes small, a large arc current does not flow when the FC relay FCRG is turned on, so the FC relay FCRG is not welded.

The IPM 130 includes high-voltage wires 132B, 132G, 142B, 142G, an inverter 134, the DDC converter 140, a discharge mechanism 144, and connectors CN4, CN5, CN6, CN7. The inverter 134 includes two-line H-bridge circuits (not shown). The inverter 134 converts a direct-current power, supplied to the high-voltage wires 132B, 132G, to two three-phase alternating currents and outputs the two three-phase alternating currents to the connectors CN5, CN6. The air compressor 136 is connected to the connector CN5. The drive motor 138 is connected to the connector CN6. The air compressor 136 supplies air as cathode gas to the fuel cell 104. The drive motor 138 drives drive wheels (not shown) of the vehicle 1. The drive motor 138 functions as a regenerative motor during deceleration of the vehicle 1. One of the two-line H-bridge circuits of the inverter 134, the connector CN5, and the air compressor 136 make up the air compressor unit 135. The other one of the two-line H-bridge circuits of the inverter 134, the connector CN6, and the drive motor 138 make up the drive motor unit 137.

The DDC converter 140 is a bidirectional DC-DC converter that steps down a voltage, input from the connector CN4 to the high-voltage wires 132B, 132G, and outputs the stepped-down voltage to the connector CN7, and that also steps up a voltage, input to the connector CN7, and outputs the stepped-up voltage to the high-voltage wires 132B, 132G. The DDC converter 140 includes high-voltage wires 142B, 142G, a reactor L2, switching transistors TR2, TR3, diodes D2, D3, and smoothing capacitors C2, C3. The switching transistors TR2, TR3 are provided in series with each other between the positive high-voltage wire 132B and the negative high-voltage wire 132G. The diode D2 is provided in parallel with the switching transistor TR2. The diode D3 is provided in parallel with the switching transistor TR3. The reactor L2 is provided between an intermediate node between the switching transistors TR2, TR3 and the positive high-voltage wire 142B. The positive high-voltage wire 142B is connected to the positive side of the connector CN7. The smoothing capacitor C2 is provided between the positive high-voltage wire 142B and the negative high-voltage wire 142G. The negative high-voltage wire 132G and the negative high-voltage wire 142G are connected and have the same potential. The smoothing capacitor C3 is provided between the positive high-voltage wire 132B and the negative high-voltage wire 132G.

During deceleration of the vehicle 1, the drive motor 138 (also referred to as traction motor 138) functions as a regenerative motor, regenerates an electric power, and applies regenerative brake. A secondary battery 194 is charged with a regenerated electric power. However, when the secondary battery 194 becomes a fully charged state, the secondary battery 194 cannot be charged any more, so the drive motor 138 is not able to apply regenerative brake. In this case, the discharge mechanism 144 consumes a regenerated electric power, thus allowing the drive motor 138 to function as a regenerative brake.

The air conditioner unit 150 includes an inverter 152, the air conditioner 154, and a connector CN8. The air conditioner 154 conditions air in a vehicle cabin. The connector CN8 is connected to the high-voltage wires 142B, 142G of the IPM 130. A fuse Fz is provided between the connector CN8 and the high-voltage wire 142B. A step-down converter 156 is connected to the high-voltage wires 142B, 142G of the IPM 130. A lead storage battery 158 is connected to the step-down converter 156. The step-down converter 156 steps down the voltage of the high-voltage wires 142B, 142G to the voltage of the lead storage battery 158 and supplies the voltage to the lead storage battery 158. The lead storage battery 158 is used as a power supply for low-voltage auxiliaries of the vehicle 1, such as a control unit 400, turn signal flashers, head lamps, a wiper, and powered windows (not shown).

The branching unit 160 includes high-voltage wires 162B, 162G and connectors CN9, CN10 and is a device that distributes an electric power supplied to the connector CN9 or the connector CN10. The heater 164, the water pump unit 170, and the hydrogen pump unit 180 are connected to the branching unit 160. The water pump unit 170 includes an inverter 172 and the water pump 174. The water pump 174 circulates coolant that is supplied to the fuel cell 104. Part of coolant that is supplied to the fuel cell 104 is branched from a cooling passage and is used to heat the vehicle cabin. The heater 164 heats branched coolant. The hydrogen pump unit 180 includes an inverter 182 and the hydrogen pump unit 184. The hydrogen pump 184 re-supplies the fuel cell 104 with hydrogen as anode off-gas in exhaust gas emitted from the fuel cell 104.

The secondary battery unit 190 includes high-voltage wires 192B, 192G, a secondary battery 194, a system main relay 195, a voltmeter 196, an ammeter 198, and a service plug SP. For example, a lithium ion battery, a nickel-metal hydride battery, or the like, may be used as the secondary battery 194. The secondary battery 194 is charged with a dump electric power when the amount of electric power generated by the fuel cell 104 is greater than an electric power consumption of the power consuming devices. The secondary battery 194 discharges an electric power equivalent to a shortage of electric power when the amount of electric power generated by the fuel cell 104 is less than the electric power consumption of the power consuming devices. Thus, an electric power equivalent to the shortage is supplied to the power consuming devices.

The voltmeter 196 detects a terminal voltage of the secondary battery 194. The ammeter 198 detects a charge and discharge current of the secondary battery 194. The voltmeter 196 and the ammeter 198 make up a charge-discharge amount sensor for calculating the amount of charge and discharge of the secondary battery 194. The system main relay 195 includes a positive contact (hereinafter, referred to as system main relay SMRB), a negative contact (hereinafter, referred to as system main relay SMRG), a precharge contact (hereinafter, referred to as precharge relay SMRP), and a resistor R2. The positive system main relay SMRB is provided in the positive high-voltage wire 192B. The negative system main relay SMRG is provided in the negative high-voltage wire 192G. The precharge relay SMRP and the resistor R2 are connected in series with each other and are provided in parallel with the negative system main relay SMRG. The service plug SP is provided inside the secondary battery 194.

An outlet OL is connected to the high-voltage wires 192B, 192G via the power output relay 50. When electric power is supplied to the external power output part 32, the external power output part 32 is connected to the outlet OL.

In the present embodiment, the high-voltage wires 142B, 162B, 192B from the DDC converter 140 to the secondary battery 194 have the same potential, and also the high-voltage wires 142G, 162G, 192G have the same potential.

The fuel cell system 10 further includes an anode gas supply system for supplying hydrogen that is anode gas to the fuel cell 104. The anode gas supply system includes a hydrogen tank, an anode supply pipe that connects the hydrogen tank and the fuel cell 104, and a valve and an injector provided in the anode supply pipe.

FIG. 2 is an internal block diagram of the controller 20. The controller 20 includes a CPU 201 and a storage unit 211. The storage unit 211 is made up of a ROM, a RAM, or the like. Various programs for controlling the fuel cell system 10 and various data are stored in the storage unit 211. The CPU 201 functions as a calculation section 203, an estimation section 205, an identification section 207, a power generation amount adjustment section 208, and a command value control section 209 by running the various programs stored in the storage unit 211.

The calculation section 203 calculates an actual amount of charge and discharge [W] of the secondary battery 194 by using detected values of the voltmeter 196 and ammeter 198 that make up the charge-discharge amount sensor. Specifically, the calculation section 203 calculates the product of a voltage detected by the voltmeter 196 and a current detected by the ammeter 198 as an actual amount of charge and discharge [W]. The amount of charge of the secondary battery 194 is calculated as a positive value, and the amount of discharge is calculated as a negative value.

The estimation section 205 estimates an estimated amount of charge and discharge [W] by using an electric power consumption [W] of each power consuming device and the amount of electric power [W] generated by the fuel cell 104. The estimated amount of charge and discharge [W] is the amount of charge and discharge of the secondary battery 194. The electric power consumption [W] of each power consuming device is estimated by using the operation command value for the power consuming device. Of the estimated amount of charge and discharge, the amount of charge is estimated as a positive value, and the amount of discharge is estimated as a negative value. The operation command values are values that are acquired from the command value control section 209. Examples of the operation command values include a rotation speed for the air conditioner 154, the hydrogen pump 184, or the water pump 174, a torque for the air compressor 136 or the drive motor 138, and a heat generation amount for the heater 164. The relationship between an electric power consumption and each of a rotation speed, a torque, and a heat generation amount as the operation command values is stored in the storage unit 211 as an electric power consumption map (not shown). The estimation section 205 calculates an electric power consumption of each power consuming device by consulting the electric power consumption maps for the acquired operation command values. The estimation section 205, for example, calculates the amount of electric power generated by the fuel cell 104 by using a power generation amount map (not shown). The power generation amount map represents the relationship between a flow rate of oxidant gas supplied and an amount of electric power generated and is stored in the storage unit 211. In another embodiment, the estimation section 205 may calculate the amount of electric power generated by the fuel cell 104 by using a detected value of the voltmeter 106 and a detected value of an ammeter (not shown) that detects the current of the fuel cell 104.

The identification section 207 identifies a device to be identified in a first case where the absolute value of the difference (a deviation in the amount of charge and discharge) between an actual amount of charge and discharge and an estimated amount of charge and discharge is greater than or equal to a predetermined first threshold. Of the power consuming devices, the device to be identified is a device in which there is a deviation between an electric power consumption estimated by the estimation section 205 and an actual electric power consumption. Specifically, the identification section 207 executes a variation process of varying the operation command value for one of the power consuming devices. The identification section 207 identifies the power consuming device of which the operation command value is varied as a device to be identified in a second case where the absolute value of the difference between the amount of change in actual amount of charge and discharge and the amount of change in estimated amount of charge and discharge before and after execution of the variation process is greater than a second threshold. This will be described in detail later.

The power generation amount adjustment section 208 adjusts the amount of electric power generated by the fuel cell 104. The power generation amount adjustment section 208, for example, adjusts the amount of electric power generated by the fuel cell 104 by adjusting the flow rate of cathode gas or anode gas that is supplied to the fuel cell 104.

The command value control section 209 adjusts and outputs operation command values to control the operations of the power consuming devices 138, 136, 184, 174, 164, 154.

Figure 3:
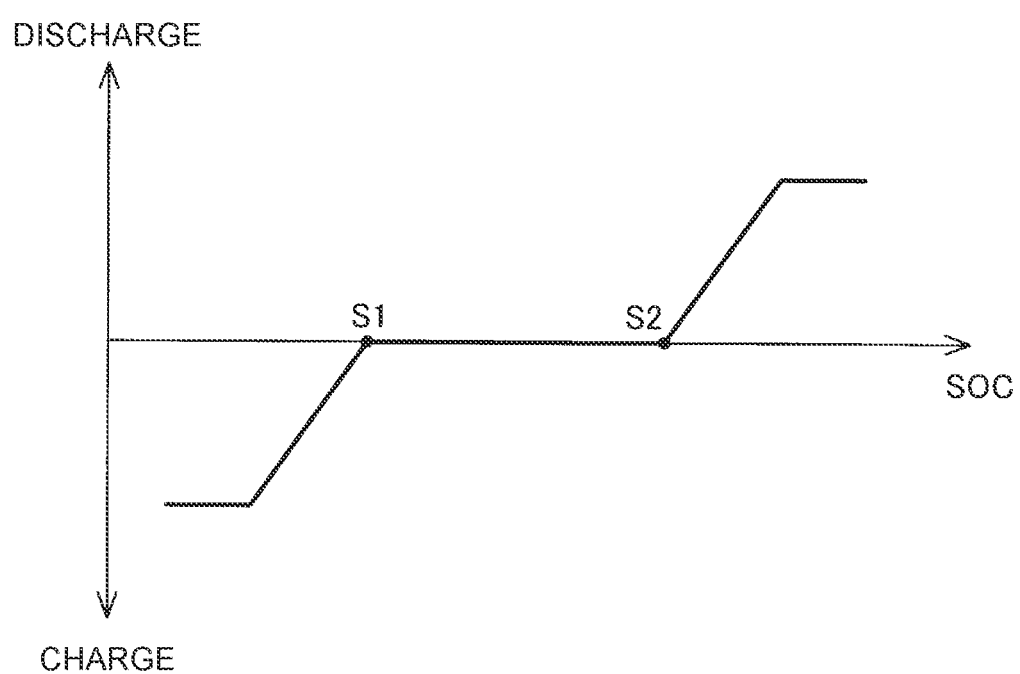
FIG. 3 is a view for illustrating an SOC map.

FIG. 3 is a view for illustrating an SOC map. The SOC map is stored in the storage unit 211. The controller 20 controls the operation of the fuel cell system 10 such that the state of charge SOC of the secondary battery 194 falls between a lower limit value S1 and an upper limit value S2. For example, when the state of charge SOC of the secondary battery 194 exceeds the upper limit value S2 or is likely to exceed the upper limit value S2, the controller 20 causes the fuel cell 104 to generate an electric power such that the amount of electric power generated is less than the amount of electric power required from the power consuming devices 138, 136, 184, 174, 164, 154. Thus, an electric power equivalent to a shortage of electric power is discharged by the secondary battery 194, so the state of charge SOC decreases. For example, when the state of charge SOC of the secondary battery 194 is lower than the lower limit value S1 or is likely to be lower than the lower limit value S1, the controller 20 causes the fuel cell 104 to generate an electric power such that the amount of electric power generated is greater than the amount of electric power required from the power consuming devices 138, 136, 184, 174, 164, 154. Thus, the secondary battery 194 is charged with a dump electric power, so the state of charge SOC increases. As described above, the fuel cell system 10 is controlled such that the secondary battery 194 is discharged when a discharging condition is satisfied in accordance with the SOC map, and the fuel cell system 10 is controlled such that the secondary battery 194 is charged when a charging condition is satisfied in accordance with the SOC map.

Figure 4:
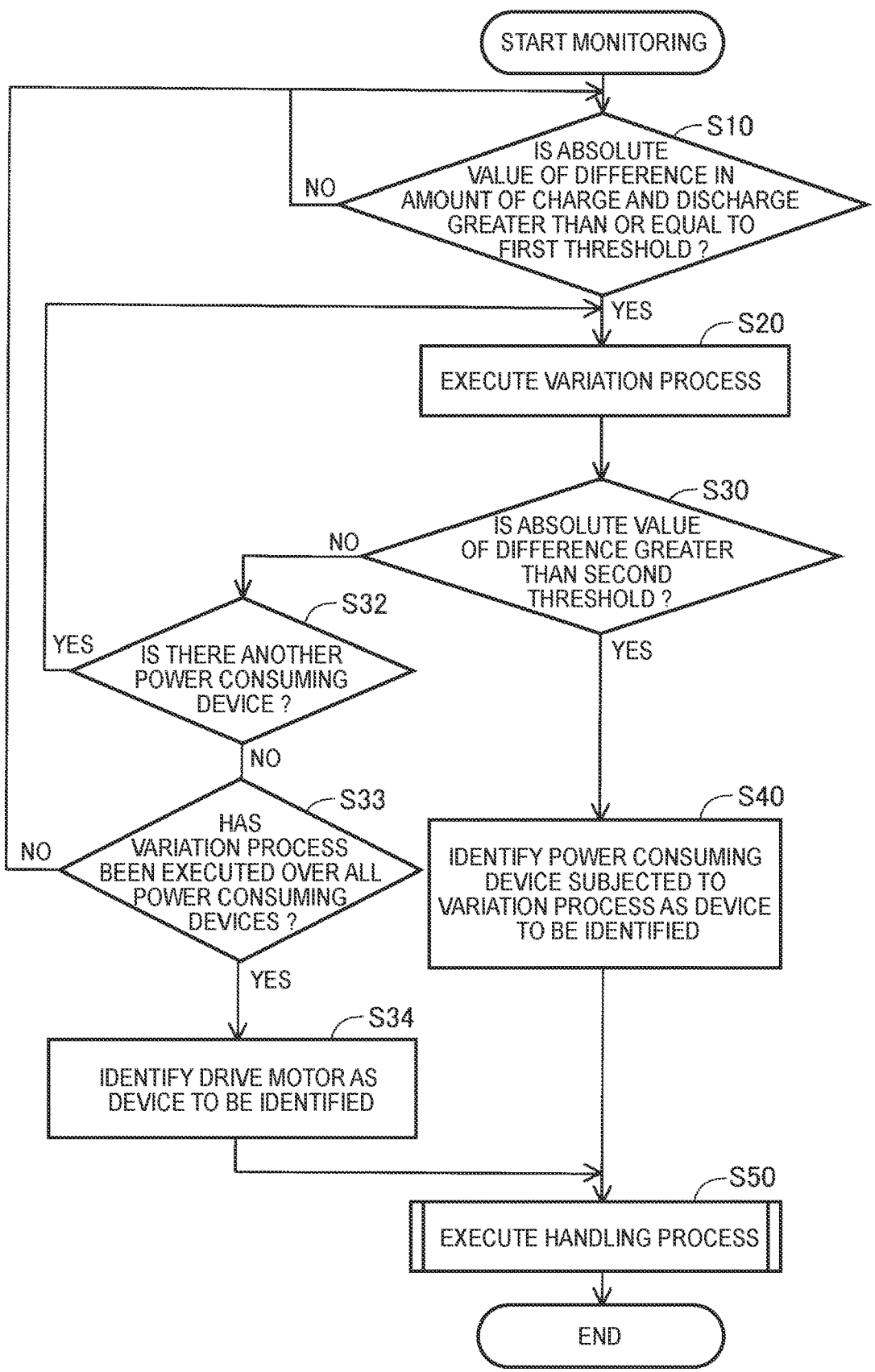
FIG. 4 is a flowchart of a monitoring process that the controller executes.

FIG. 4 is a flowchart of a monitoring process that the controller 20 executes. FIG. 5 is a table that shows power consuming devices to be subjected to the monitoring process. The flowchart of FIG. 4 is started in response to startup of the fuel cell system 10 and is repeatedly executed at predetermined time intervals.

As shown in FIG. 4, in the monitoring process, the identification section 207 determines whether the absolute value of the difference between the actual amount of charge and discharge and estimated amount of charge and discharge of the secondary battery 194 is greater than or equal to the predetermined first threshold (step S10). In other words, in step S10, it is determined whether there is a deviation in the amount of charge and discharge of the secondary battery 194. The first threshold just needs to be a value to such an extent that a deviation in electric power consumption is occurring in a power consuming device. When negative determination is made in step S10, the identification section 207 repeatedly executes step S10. On the other hand, when affirmative determination is made in step S10, the variation process of varying the operation command value for one of the power consuming devices PC is executed (step S20). In varying the operation command value, the operation command value is varied by a constant amount regardless of a required value from the power consuming device PC.

As shown in FIG. 4, subsequently to step S20, the identification section 207 determines whether the absolute value of the difference between the amount of change in actual amount of charge and discharge and the amount of change in estimated amount of charge and discharge before and after execution of the variation process is greater than the predetermined second threshold (step S30). The second threshold is desirably set to greater than or equal to a value that is estimated when there is no deviation in electric power consumption in the power consuming device PC to be subjected to the variation process. In the present embodiment, for example, the second threshold is set to zero. In other words, in step S30 in the present embodiment, the identification section 207 determines whether the amount of change in actual amount of charge and discharge and the amount of change in estimated amount of charge and discharge before and after the execution of the variation process are different from each other.

As shown in FIG. 5, the power consuming devices PC to be subjected to the variation process depend on the power generation status of the fuel cell 104. When the fuel cell 104 is generating an electric power, the power consuming devices PC that less influence the amount of electric power generated by the fuel cell 104 even when the operation command values are varied are subjected to step S20. Specifically, when the fuel cell 104 is generating an electric power, the water pump unit 170, the heater 164, and the air conditioner 154 are the intended power consuming devices PC. When the fuel cell 104 is not generating an electric power, the air compressor 136 and the hydrogen pump 184 are the intended power consuming devices PC in addition to the water pump unit 170, the heater 164, and the air conditioner 154.

The process from step S20 is executed over the power consuming devices PC one by one. For example, when the fuel cell 104 is generating an electric power, the process from step S20 is executed sequentially over the water pump unit 170, the heater 164, and the air conditioner 154. In other words, the identification section 207 varies the operation command value for the water pump unit 170 through the command value control section 209 and then executes step S30. When negative determination is made in step S30, the identification section 207 subsequently executes step S20 over the heater 164. After step S20 is executed over the heater 164, when negative determination is made in step S30, the identification section 207 executes step S20 over the air conditioner 154.

As shown in FIG. 4, when negative determination is made in step S30, the controller 20 determines whether there is any other power consuming device PC not subjected to the variation process among the power consuming devices PC to be subjected to the variation process (step S32). When affirmative determination is made in step S32, step S20 is executed over the another power consuming device PC as described above. When negative determination is made in step S32, the controller 20 determines whether the variation process of step S20 and the determination process of step S30 are executed over all the power consuming devices PC other than the drive motor 138 (step S33). In the present embodiment, all the power consuming devices PC other than the drive motor 138 are the air compressor 136, the hydrogen pump 184, the water pump 174, the heater 164, and the air conditioner 154. When negative determination is made in step S33, step S10 is executed again. When affirmative determination is made in step S33, the identification section 207 identifies a device to be identified, in which a deviation in electric power consumption is occurring, as the drive motor 138 (step S34). After step S34, a handling process of step S50 (described later) is executed over the drive motor 138.

On the other hand, when affirmative determination is made in step S30, the identification section 207 identifies the power consuming device PC subjected to the variation process in step S20 as a device to be identified, in which a deviation in electric power consumption is occurring (step S40). Subsequently to step S40, the controller 20 executes the handling process appropriate for the device to be identified (step S50).

FIG. 6 is a first timing chart for illustrating step S10 to step S30 in FIG. 4. FIG. 6 shows an example in which affirmative determination is made in step S30. In the example shown in FIG. 6, the fuel cell system 10 is controlled such that the secondary battery 194 exhibits a target amount of discharge WB1.

At time t1, the absolute value of the difference in the amount of charge and discharge of the secondary battery 194 is greater than or equal to the first threshold, so the identification section 207 executes the variation process over one of the power consuming devices PC. In other words, the identification section 207 executes the variation process in a period from time t1 to time t2. Specifically, the identification section 207 reduces the electric power consumption from the electric power consumption at time t1 to the electric power consumption at time t2 by varying the operation command value for the one of the power consuming devices PC. In other words, in the example shown in FIG. 6, the operation of the power consuming device PC is stopped at time t2 through the variation process. The power generation amount adjustment section 208 reduces the amount of electric power generated by the fuel cell 104 by the same amount with a reduction in the electric power consumption of the power consuming device PC from time t1 to time t2 such that the target amount of charge and discharge is attained.

In this case, the absolute value of the difference between the amount of change $\Delta$WB1 in actual amount of charge and discharge and the amount of change (zero in FIG. 6) in estimated amount of charge and discharge that is the target amount of charge and discharge before and after the variation process is greater than the second threshold (zero in the present embodiment). Thus, in the example shown in FIG. 6, affirmative determination is made in step S30, and the identification section 207 identifies the power consuming device PC subjected to the variation process as a device to be identified. After the determination of step S30, the identification section 207 may send the status before variation to the power consuming device PC via the command value control section 209, that is, the identification section 207 may cancel the variation process and send the operation command value commensurate with the amount of electric power required from the power consuming device PC to the power consuming device PC via the command value control section 209. In the example shown in FIG. 6, the variation process is cancelled at time t3.

Figure 7:
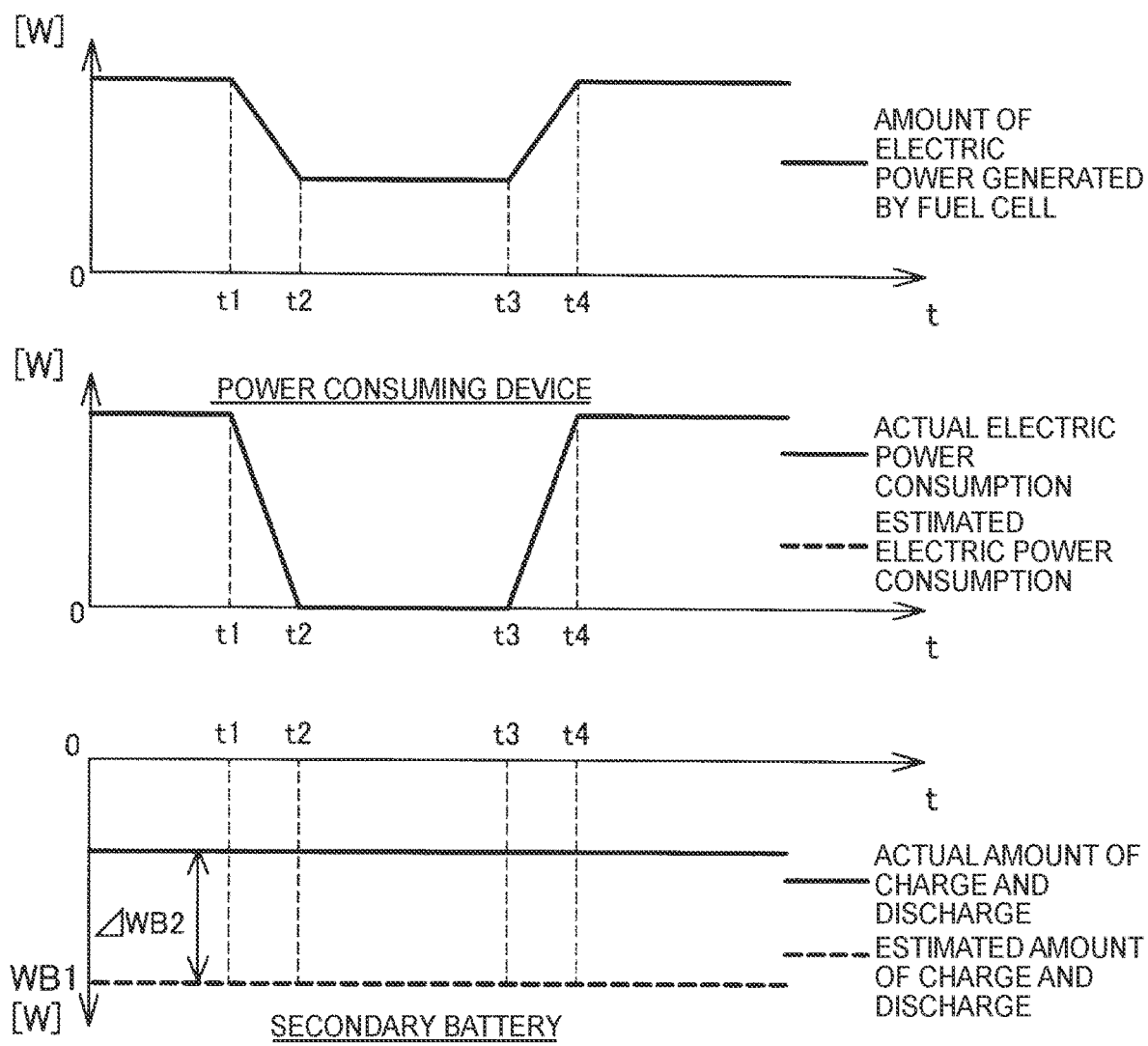
FIG. 7 is a second timing chart for illustrating step S10 to step S30 in FIG. 4.

FIG. 7 is a second timing chart for illustrating step S10 to step S30 in FIG. 4. FIG. 7 shows an example in which negative determination is made in step S30. In the example shown in FIG. 7, the fuel cell system 10 is controlled such that the secondary battery 194 exhibits a target amount of discharge WB1.

At time t1, the absolute value of the difference in the amount of charge and discharge of the secondary battery 194 is greater than or equal to the first threshold, so the identification section 207 executes the variation process over one of the power consuming devices PC. In other words, the identification section 207 executes the variation process in a period from time t1 to time t2, as in the case of FIG. 6.

In this case, the absolute value of the difference between the amount of change (zero in FIG. 7) in actual amount of charge and discharge and the amount of change (zero in FIG. 7) in estimated amount of charge and discharge that is the target amount of charge and discharge before and after the variation process is equal to the second threshold (zero in the present embodiment). Thus, in the example shown in FIG. 7, negative determination is made in step S30. After the determination of step S30, the identification section 207 may send the status before variation to the power consuming device PC via the command value control section 209, that is, the identification section 207 may cancel the variation process and send the operation command value commensurate with the amount of electric power required from the power consuming device PC to the power consuming device PC via the command value control section 209. In the example shown in FIG. 7, the variation process is cancelled at time t3, as in the case of the example shown in FIG. 6.

Figure 8:
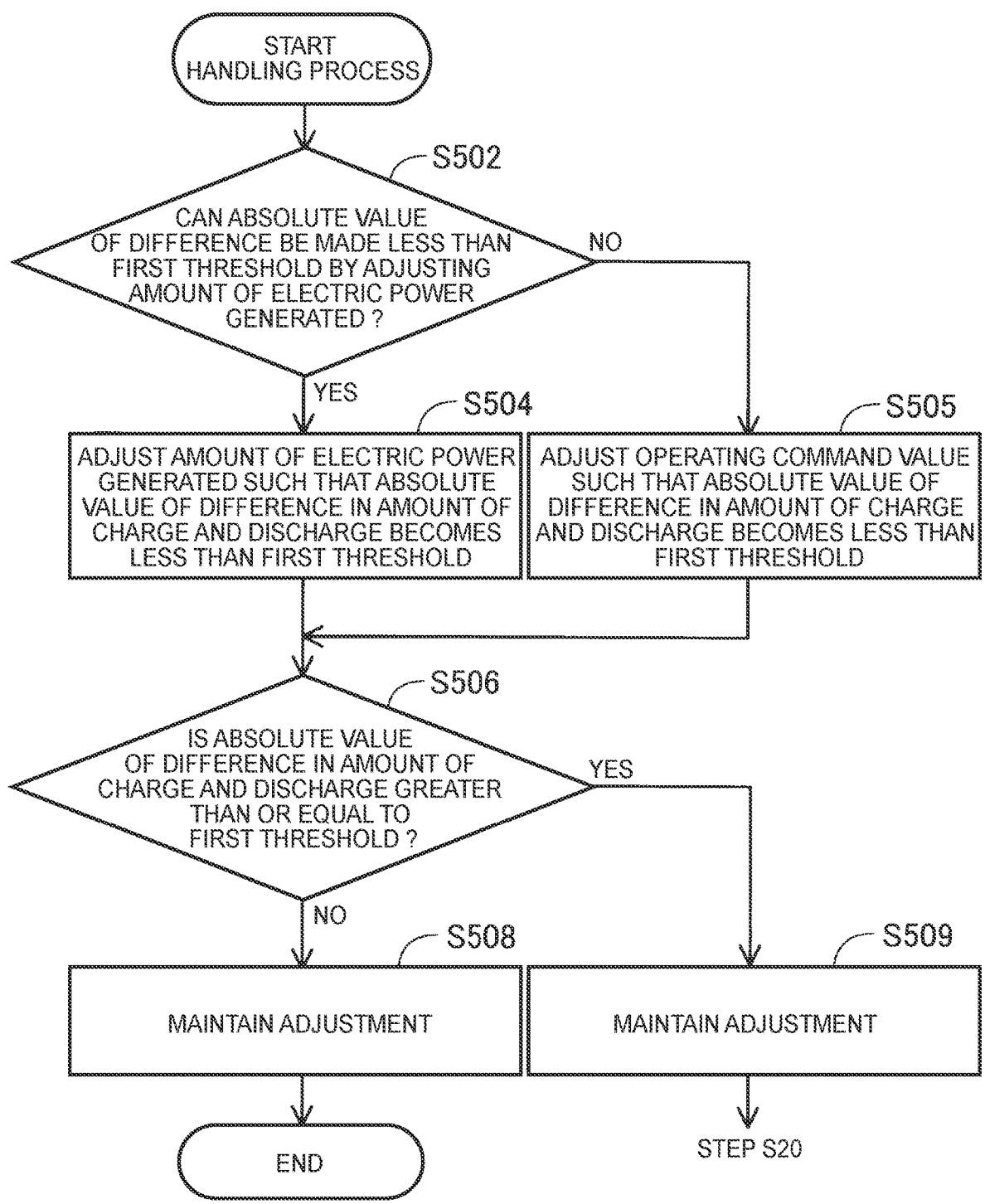
FIG. 8 is a flowchart of a handling process of step S50 of FIG. 4.

FIG. 8 is a flowchart of the handling process of step S50 of FIG. 4. First, the controller 20 determines whether the absolute value of the difference between the actual amount of charge and discharge and estimated amount of charge and discharge of the secondary battery 194 can be made less than the first threshold by adjusting the amount of electric power generated by the fuel cell 104 (step S502). Specifically, the controller 20 determines whether the absolute value of the difference between the actual amount of charge and discharge and estimated amount of charge and discharge of the secondary battery 194 can be made less than the first threshold by increasing or decreasing an actual amount of electric power generated with respect to a required amount of electric power generated by the fuel cell 104. The following may be conceivable as an example in which negative determination is made in step S502. In other words, when the actual amount of discharge of the secondary battery 194 is greater than the estimated amount of discharge, the actual amount of discharge needs to be decreased and brought close to the estimated amount of discharge by increasing the amount of electric power generated by the fuel cell 104 above the required amount of electric power generated. However, when the fuel cell 104 is generating an electric power at the upper limit according to the required amount of electric power generated, the amount of electric power generated by the fuel cell 104 cannot be increased, so negative determination is made in step S502. In the handling process of step S50, the estimated amount of charge and discharge that is used in determinations of step S504, step S505, and step S506 (described later) is a value estimated in step S10 before execution of the handling process.

When affirmative determination is made in step S502, the power generation amount adjustment section 208 adjusts the amount of electric power generated by the fuel cell 104 such that the absolute value of the difference between the actual amount of charge and discharge and the estimated amount of charge and discharge used in step S10 becomes less than the first threshold (step S504). Thus, the operation of the fuel cell system 10 can be accurately controlled such that the state of charge SOC of the secondary battery 194 falls between the lower limit value S1 and the upper limit value S2, so an overcharge or overdischarge of the secondary battery 194 can be avoided. The details of step S504 will be described below.

In the case where the secondary battery 194 is being charged on the condition that the charging condition is satisfied, when the actual amount of charge and discharge (here, the actual amount of charge) is less than the estimated amount of charge and discharge (here, the estimated amount of charge), a device to be identified that is the power consuming device PC in which a deviation in electric power consumption is occurring is estimated to be consuming an electric power greater than an estimated electric power consumption. Thus, the power generation amount adjustment section 208 in step S504 causes the fuel cell 104 to generate an electric power such that the absolute value of the difference between the actual amount of charge and discharge and estimated amount of charge and discharge of the secondary battery 194 becomes less than the first threshold and the amount of electric power generated by the fuel cell 104 becomes greater than the required amount of electric power generated. Thus, the secondary battery 194 is charged with a larger amount of electric power, so the absolute value of the difference between the actual amount of charge and discharge and the estimated amount of charge and discharge becomes less than the first threshold.

On the other hand, in the case where the secondary battery 194 is being charged on the condition that the charging condition is satisfied, when the actual amount of charge and discharge (here, the actual amount of charge) is greater than the estimated amount of charge and discharge (here, the estimated amount of charge), a device to be identified that is the power consuming device PC in which a deviation in electric power consumption is occurring is estimated to be consuming an electric power less than an estimated electric power consumption. Thus, the power generation amount adjustment section 208 in step S504 causes the fuel cell 104 to generate an electric power such that the absolute value of the difference between the actual amount of charge and discharge and estimated amount of charge and discharge of the secondary battery 194 becomes less than the first threshold and the amount of electric power generated by the fuel cell 104 becomes less than the required amount of electric power generated. Thus, the secondary battery 194 is charged with a smaller amount of electric power, so the absolute value of the difference between the actual amount of charge and discharge and the estimated amount of charge and discharge becomes less than the first threshold.

In the case where the secondary battery 194 is being discharged on the condition that the discharging condition is satisfied, when the actual amount of charge and discharge (here, the actual amount of discharge) is less than the estimated amount of charge and discharge (here, the estimated amount of discharge), a device to be identified that is the power consuming device PC in which a deviation in electric power consumption is occurring is estimated to be consuming an electric power less than an estimated electric power consumption. Thus, the power generation amount adjustment section 208 in step S504 causes the fuel cell 104 to generate an electric power such that the absolute value of the difference between the actual amount of charge and discharge and estimated amount of charge and discharge of the secondary battery 194 becomes less than the first threshold and the amount of electric power generated by the fuel cell 104 becomes less than the required amount of electric power generated. Thus, a larger amount of electric power is discharged from the secondary battery 194, so the absolute value of the difference between the actual amount of charge and discharge and the estimated amount of charge and discharge becomes less than the first threshold.

On the other hand, in the case where the secondary battery 194 is being discharged on the condition that the discharging condition is satisfied, when the actual amount of charge and discharge (here, the actual amount of discharge) is greater than the estimated amount of charge and discharge (here, the estimated amount of discharge), a device to be identified that is the power consuming device PC in which a deviation in electric power consumption is occurring is estimated to be consuming an electric power greater than an estimated electric power consumption. Thus, the power generation amount adjustment section 208 in step S504 causes the fuel cell 104 to generate an electric power such that the absolute value of the difference between the actual amount of charge and discharge and estimated amount of charge and discharge of the secondary battery 194 becomes less than the first threshold and the amount of electric power generated by the fuel cell 104 becomes greater than the required amount of electric power generated. Thus, a smaller amount of electric power is discharged from the secondary battery 194, so the absolute value of the difference between the actual amount of charge and discharge and the estimated amount of charge and discharge becomes less than the first threshold.

When negative determination is made in step S502, the command value control section 209 adjusts the operation command value for the device to be identified, identified in step S40 or step S34, such that the absolute value of the difference between the actual amount of charge and discharge and estimated amount of charge and discharge of the secondary battery 194 becomes less than the first threshold (step S505). Thus, the operation of the fuel cell system 10 can be accurately controlled such that the state of charge SOC of the secondary battery 194 falls between the lower limit value S1 and the upper limit value S2, so an overcharge or overdischarge of the secondary battery 194 can be avoided.

In the case where the secondary battery 194 is being charged on the condition that the charging condition is satisfied, when the actual amount of charge and discharge (here, the actual amount of charge) is less than the estimated amount of charge and discharge (here, the estimated amount of charge), a device to be identified that is the power consuming device PC in which a deviation in electric power consumption is occurring is estimated to be consuming an electric power greater than an estimated electric power consumption. Thus, the command value control section 209 adjusts the operation command value for the device to be identified such that the electric power consumption becomes less than the electric power required from the device to be identified. For example, when the device to be identified is the hydrogen pump 184, the command value control section 209 controls the operation of the hydrogen pump 184 by setting a rotation speed lower than a required rotation speed of the hydrogen pump 184 as the operation command value.

On the other hand, in the case where the secondary battery 194 is being charged on the condition that the charging condition is satisfied, when the actual amount of charge and discharge (here, the actual amount of charge) is greater than the estimated amount of charge and discharge (here, the estimated amount of charge), a device to be identified that is the power consuming device PC in which a deviation in electric power consumption is occurring is estimated to be consuming an electric power less than an estimated electric power consumption. Thus, the command value control section 209 adjusts the operation command value for the device to be identified such that the electric power consumption becomes greater than the electric power required from the device to be identified. For example, when the device to be identified is the hydrogen pump 184, the command value control section 209 controls the operation of the hydrogen pump 184 by setting a rotation speed higher than a required rotation speed of the hydrogen pump 184 as the operation command value.

In the case where the secondary battery 194 is being discharged on the condition that the discharging condition is satisfied, when the actual amount of charge and discharge (here, the actual amount of discharge) is less than the estimated amount of charge and discharge (here, the estimated amount of discharge), a device to be identified that is the power consuming device PC in which a deviation in electric power consumption is occurring is estimated to be consuming an electric power less than an estimated electric power consumption. Thus, the command value control section 209 adjusts the operation command value for the device to be identified such that the electric power consumption becomes greater than the electric power required from the device to be identified. For example, when the device to be identified is the hydrogen pump 184, the command value control section 209 controls the operation of the hydrogen pump 184 by setting a rotation speed higher than a required rotation speed of the hydrogen pump 184 as the operation command value.

On the other hand, in the case where the secondary battery 194 is being discharged on the condition that the discharging condition is satisfied, when the actual amount of charge and discharge (here, the actual amount of discharge) is greater than the estimated amount of charge and discharge (here, the estimated amount of discharge), a device to be identified that is the power consuming device PC in which a deviation in electric power consumption is occurring is estimated to be consuming an electric power greater than an estimated electric power consumption. Thus, the command value control section 209 adjusts the operation command value for the device to be identified such that the electric power consumption becomes less than the electric power required from the device to be identified. For example, when the device to be identified is the hydrogen pump 184, the command value control section 209 controls the operation of the hydrogen pump 184 by setting a rotation speed lower than a required rotation speed of the hydrogen pump 184 as the operation command value.

Subsequently to step S504 or step S505, the identification section 207 determines whether the difference between the actual amount of charge and discharge after execution of step S504 or step S505 of the secondary battery 194 and the estimated amount of charge and discharge estimated in step S10 is greater than or equal to the predetermined first threshold (step S506). When negative determination is made in step S506, adjustment in step S504 or step S505 is continued and maintained (step S508). On the other hand, when affirmative determination is made in step S506, adjustment of step S504 or step S505 is continued and maintained (step S509), and the process from step S20 is executed again. In other words, when affirmative determination is made in step S506, a deviation in electric power consumption can be occurring in a plurality of the power consuming devices PC, so the process from step S20 is executed over the power consuming device PC that has not been subjected to step S20.

According to the above-described embodiment, as described in step S20, step S30, and step S40 of FIG. 4, the identification section 207 is able to easily identify a device to be identified by using the difference between the amount of change in actual amount of charge and discharge and the amount of change in estimated amount of charge and discharge before and after execution of the variation process.

B. Other Embodiments

B-1. First Alternative Embodiment

When the absolute value of the difference between the actual amount of charge and discharge and estimated amount of charge and discharge of the secondary battery 194 is greater than or equal to the first threshold even after the handling process is executed, the controller 20 may execute the following fail-safe process. In the fail-safe process, the command value control section 209 executes a first limiting process of operating the drive motor 138 at an operation command value at which the electric power consumption of the drive motor 138 is a necessary minimum electric power. In this case as well, when the absolute value of the difference between the actual amount of charge and discharge and estimated amount of charge and discharge of the secondary battery 194 is greater than or equal to the first threshold, the command value control section 209 executes not only the first limiting process but also a second limiting process of operating the hydrogen pump 184 and the air conditioner 154 at operation command values at which the electric power consumptions of the hydrogen pump 184 and air conditioner 154 each are a necessary minimum electric power. In this case as well, when the absolute value of the difference between the actual amount of charge and discharge and estimated amount of charge and discharge of the secondary battery 194 is greater than or equal to the first threshold, the command value control section 209 executes a third limiting process of operating the drive motor 138 at an operation command value at which the electric power consumption of the air compressor 136 is a necessary minimum electric power.

The disclosure is not limited to the above-described embodiments; the disclosure encompasses various modifications. For example, the above-described embodiments are described in detail to illustrate the disclosure easily; however, the disclosure is not necessarily limited to the one including all the described components. Part of the components of one embodiment may be replaced with the components of another one of the alternative embodiments or the components of another one of the alternative embodiments may be added to the components of one embodiment. As for part of the components of each embodiment, addition, deletion, or replacement of other components is possible. A combination of one embodiment, one alternative embodiment, and one modification is applicable.

What is claimed is:

1. A fuel cell system that is mounted on a vehicle, the fuel cell system comprising:
　a fuel cell;
　a plurality of power consuming devices configured to consume a generated electric power generated by the fuel cell;
　a secondary battery configured to, when an amount of electric power generated by the fuel cell is greater than an electric power consumption of the plurality of power consuming devices, be charged with a dump electric power and, when the amount of electric power generated by the fuel cell is less than the electric power consumption of the plurality of power consuming devices, discharge an electric power equivalent to a shortage of electric power;

a charge-discharge amount sensor configured to be used to calculate an amount of charge and discharge of the secondary battery; and a controller configured to control operations of the plurality of power consuming devices by using operation command values for the plurality of power consuming devices, wherein:

the controller includes a calculation section configured to calculate an actual amount of charge and discharge of the secondary battery by using a detected value of the charge-discharge amount sensor, an estimation section configured to estimate electric power consumptions of the plurality of power consuming devices by using the operation command values, and estimate an estimated amount of charge and discharge of the secondary battery by using the estimated electric power consumptions and the amount of electric power generated by the fuel cell, and an identification section configured to, in a first case where an absolute value of a difference between the actual amount of charge and discharge and the estimated amount of charge and discharge is greater than or equal to a first threshold, identify a device to be identified, in which the electric power consumption estimated by the estimation section deviates from an actual electric power consumption, from among the plurality of power consuming devices; and the identification section is configured to execute a variation process of varying the operation command value for one of the plurality of power consuming devices and, in a second case where an absolute value of a difference between an amount of change in the actual amount of charge and discharge and an amount of change in the estimated amount of charge and discharge before and after execution of the variation process is greater than a second threshold, identify the power consuming device, for which the operation command value is varied, as the device to be identified.

2. The fuel cell system according to claim 1, wherein the controller further includes a power generation amount adjustment section configured to, in the second case, adjust the amount of electric power generated by the fuel cell such that the absolute value of the difference between the actual amount of charge and discharge and the estimated amount of charge and discharge becomes less than the first threshold.

3. The fuel cell system according to claim 2, wherein the power generation amount adjustment section is configured to, when the secondary battery satisfies a charging condition, when the actual amount of charge and discharge is less than the estimated amount of charge and discharge, cause the fuel cell to generate an electric power such that the amount of electric power generated by the fuel cell becomes greater than a required amount of electric power generated, and when the actual amount of charge and discharge is greater than the estimated amount of charge and discharge, cause the fuel cell to generate an electric power such that the amount of electric power generated by the fuel cell becomes less than the required amount of electric power generated.

4. The fuel cell system according to claim 2, wherein the power generation amount adjustment section is configured to, when the secondary battery satisfies a discharging condition, when the actual amount of charge and discharge is less than the estimated amount of charge and discharge, cause the fuel cell to generate an electric power such that the amount of electric power generated by the fuel cell becomes less than a required amount of electric power generated, and when the actual amount of charge and discharge is greater than the estimated amount of charge and discharge, cause the fuel cell to generate an electric power such that the amount of electric power generated by the fuel cell becomes greater than the required amount of electric power generated.

5. The fuel cell system according to claim 1, wherein the controller further includes a command value control section configured to, in the second case, adjust the operation command value for the device to be identified such that the absolute value of the difference between the actual amount of charge and discharge and the estimated amount of charge and discharge becomes less than the first threshold.

6. The fuel cell system according to claim 5, wherein the command value control section is configured to, when the secondary battery satisfies a charging condition, when the actual amount of charge and discharge is less than the estimated amount of charge and discharge, adjust the operation command value for the device to be identified such that the electric power consumption becomes less than a required electric power from the device to be identified, and when the actual amount of charge and discharge is greater than the estimated amount of charge and discharge, adjust the operation command value for the device to be identified such that the electric power consumption becomes greater than the required electric power from the device to be identified.

7. The fuel cell system according to claim 5, wherein the command value control section is configured to, when the secondary battery satisfies a discharging condition, when the actual amount of charge and discharge is less than the estimated amount of charge and discharge, adjust the operation command value for the device to be identified such that the electric power consumption becomes greater than a required electric power from the device to be identified, and when the actual amount of charge and discharge is greater than the estimated amount of charge and discharge, adjust the operation command value for the device to be identified such that the electric power consumption becomes less than the required electric power from the device to be identified.

8. A control method for a fuel cell system that is mounted on a vehicle, the fuel cell system including a fuel cell, a plurality of power consuming devices configured to consume a generated electric power generated by the fuel cell, a secondary battery configured to, when an amount of electric power generated by the fuel cell is greater than an electric power consumption of the plurality of power consuming devices, be charged with a dump electric power and, when the amount of electric power generated by the fuel cell is less than the electric power consumption of the plurality of power consuming devices, discharge an electric power equivalent to a shortage of electric power, and a charge-discharge amount sensor configured to be used to calculate an amount of charge and discharge of the secondary battery, the control method comprising:

a step of calculating an actual amount of charge and discharge of the secondary battery by using a detected value of the charge-discharge amount sensor;

a step of estimating electric power consumptions of the plurality of power consuming devices by using the operation command values for the plurality of power consuming devices, and estimating an estimated amount of charge and discharge of the secondary battery by using the estimated electric power consumptions and the amount of electric power generated by the fuel cell; and a step of, in a first case where an absolute value of a difference between the actual amount of charge and discharge and the estimated amount of charge and discharge is greater than or equal to a first threshold, identifying a device to be identified, in which the electric power consumption estimated in the estimating step deviates from an actual electric power consumption, from among the plurality of power consuming devices, wherein in the identifying step, a variation process of varying the operation command value for one of the plurality of power consuming devices is executed and, in a second case where an absolute value of a difference between an amount of change in the actual amount of charge and discharge and an amount of change in the estimated amount of charge and discharge before and after execution of the variation process is greater than a second threshold, identifying the power consuming device, for which the operation command value is varied, as the device to be identified.

* * * * *